Patented May 19, 1942

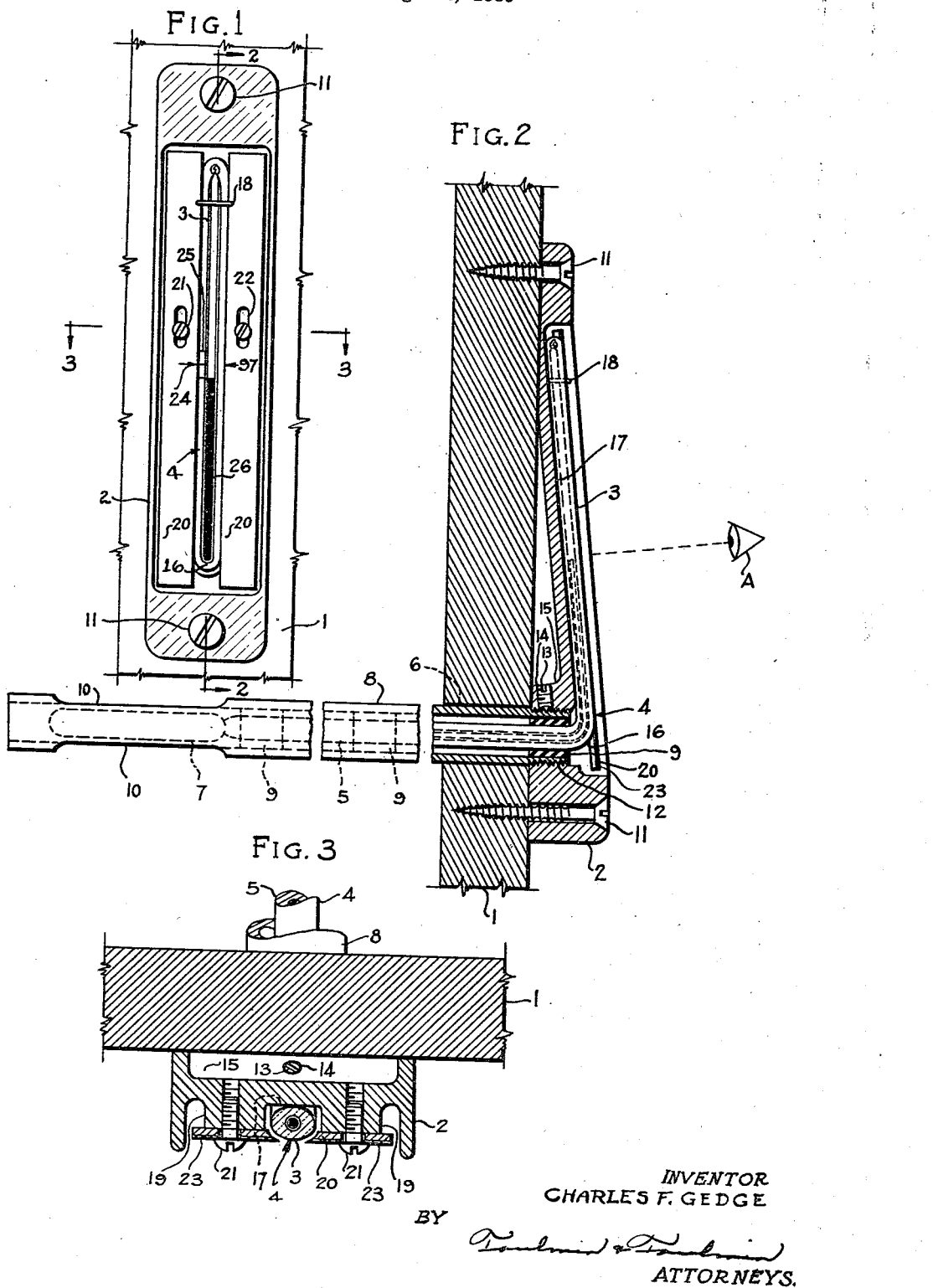
May 19, 1942.    C. F. GEDGE    2,283,360
INCLINED THERMOMETER
Filed Aug. 14, 1939
INVENTOR
CHARLES F. GEDGE
BY
ATTORNEYS.

2,283,360

UNITED STATES PATENT OFFICE 2,283,360

INCLINED THERMOMETER

Charles F. Gedge, Springfield, Ohio, assignor to The Buckeye Incubator Company, Springfield, Ohio, a corporation of Ohio Application August 14, 1939, Serial No. 290,049

2 Claims. (Cl. 73—375)

This invention relates to a thermometer and particularly to a liquid-in-glass thermometer mounted in an improved way so that the quickness and accuracy of reading the same are greatly enhanced; the invention comprehends the improved thermometer mounting, the thermometer mounted in the improved manner and the combination of the mounting and the thermometer mounted therein.

It is the principal object of the present invention to mount a liquid-in-glass thermometer such as a mercury thermometer with its scale portion at an angle of inclination relative to the vertical whereby to greatly increase the speed and accuracy with which the thermometer may be read; in a preferred form the thermometer is mounted at such an angle that the line of vision from the observer intercepts at an angle of 90° that portion of the scale where the temperature is desired to be controlled. It has been found that the mounting of the thermometer with the scale portion of its barrel at an angle of 6° to the vertical rearwardly from the observer results in maximum ease and accuracy of reading.

It is another object to devise a mounting for holding the thermometer permanently at such an angle of inclination and for conveniently mounting it at the proper angle upon a vertical surface of any suitable type.

Still another object is to devise a mounting of the type just described wherein an auxiliary scale for the thermometer is supported by the mounting with its face parallel to and in the same plane as the front of the thermometer tube.

Yet another object is to devise a thermometer of the foregoing type wherein the face of the auxiliary scale is lacquered white so as to be dull and non-reflecting thereby eliminating the reflecting action of the common silvered scales and making the thermometer easier to read.

Another object is to devise a thermometer of the type aforesaid wherein an oval thermometer barrel is employed, which further adds to the quickness of reading.

Other objects will more fully hereinafter appear.

In the accompanying drawing:

Figure 1 is a front elevation of a thermometer and mounting embodying the principles of the present invention.

Figure 2 is a vertical section on the line 2—2 of Figure 1.

Figure 3 is an enlarged horizontal section on the line 3—3 of Figure 1, looking in the direction of the arrows.

While the invention is described with particular reference to a thermometer especially adapted to be placed on the exterior of the wall of an incubator and designed to give an indication of the temperature within the incubator enclosure, it will be obvious that the principles of the present invention are applicable generally to expansible liquid-in-glass thermometers and whether employed for measuring wet or dry bulb temperature, the present invention relating to the mounting of the scale portion of the thermometer tube so that the observer is enabled to read the temperature more quickly, with less eye or body strain, and with enhanced accuracy.

Thermometers have heretofore been commonly mounted with the scale portion vertical and at a height about equal to the average height of an observer of short stature. Thus an observer of normal or above-normal height is compelled either to read the thermometer while standing straight with resulting eye-strain and error of parallax due to the fact that the line of vision is not normal to the thermometer barrel or to bend over to bring his eye on a level with the mercury. I have discovered that by disposing the scale portion at an angle of 6° rearward inclination from the vertical and from the observer that reading of the same is greatly enhanced and that the disadvantages just referred to are completely overcome, it being possible for the observer to optionally move towards or from the thermometer until his line of vision is exactly at right angles to the thermometer tube. With vertical mounting, it was impossible for the observer to bring his line of vision to a position normal to the thermometer barrel by simply moving towards or away from the thermometer. In accordance with my invention, the thermometer is mounted at an angle such that for all ordinary observers the speed, ease and accuracy of reading are improved. Preferably, I mount the thermometer at such a distance from the floor that it is easily read by standing observers of normally short stature, say at a height where the level of the mercury under the temperature to be maintained or the average of the expected level of mercury is at say five feet from the floor. Thus, observers of tall, medium and short height are all enabled to read the thermometer without eye or bodily strain and with a new ease and accuracy.

In the drawing I have illustrated an incubator thermometer of the dry bulb type having its bulb portion projecting horizontally through the vertical incubator wall and calibrated to give a reading at 97° plus or minus one degree, 97° being the temperature to be maintained in a hatcher. Obviously any range of temperature may be calibrated on the scale, although the advantages of the present invention are attained to the greatest extent with a relatively narrow range or a single temperature because it is posible to vertically position the thermometer for greatest ease in reading by average observers.

Referring in detail to the accompanying drawing, reference numeral 1 designates a vertical wall upon which is mounted by means of wood screws 11 or in any other suitable manner the case 2 for the scale portion 3 of a mercury-in-glass thermometer 4. The bulb portion 5 of the thermometer 4 projects horizontally rearwardly through a hole 6 in wall 1, the bulb being indicated as 7. A horizontal brass sleeve 8 spaced from the bulb portion 5 by rubber spacing bushings 9 supports and surrounds bulb portion 5 and protects the same. Sleeve 8 extends rearwardly beyond the bulb 7 and is provided at its rearward portion above and below with longitudinal openings 10 which allow bulb 7 to be exposed to the air.

Sleeve 8 is slidably received by hole 6 and is threadably received at its forward end within a horizontal hole 12 in the lower portion of mounting case 2. Sleeve 8 is locked in this received position by a set screw 13 passing through the case 2 and located in an inaccessible position after mounting has been completed. By removing screws 11, the entire thermometer assembly may be pulled forwardly to give access to set screw 13 for purposes of disassembly, assembly being effected in a reverse manner. Set screw 13 is threadably received in a hole 14 located centrally of a horizontally extending portion 15 of mounting member 2, hole 14 extending downwardly to hole 12.

Thermometer 4 is bent at 16 at an angle of 84°, and in this way its scale portion 3 lies at an angle of 6° rearward inclination from the vertical, while its bulb portion extends horizontally rearwardly out of view behind wall 1. Scale portion 3 is held parallel to and flush with a similarly inclined flat portion 17 of case 2 by means of a staple 18 fixedly attached to casing 2 in any suitable manner.

As indicated in Figure 3, the barrel of thermometer 4, at least over scale portion 3, is oval-shaped and is mounted with the major axis of the oval cross-section parallel to wall 1, the visibility of the mercury column being thereby enhanced.

A pair of vertical ribs 19 are provided integral with case 2 and extending parallel to and on each side of scale portion 3. These ribs have flat forward surfaces which are paralel to the scale portion 3. Upon each of these ribs 19 are mounted two scale members 20, by means of screws 21 passing through elongated slots 22 and received threadably in ribs 19. In this way scale plates 20 are adjustable vertically so as to cause the scale marking thereon to coincide with the desired scale line etched on thermometer 4.

Scale plates 20 are mounted with their forward face in the same plane with and overlapping slightly the front of the oval thermometer scale portion 3 which aids considerably in reading the thermometer. In addition, scale plates 20 are provided with a dull non-reflecting white lacquer coat 23 which further aids in the reading ease by preventing the reflection of light into the eyes of the observer which has hitherto been common with the customary silvered scales of previous thermometers.

In Figure 2, there is shown the eye A of an observer showing how the line of vision from the eye strikes the point where the level of the mercury column 26 is maintained at substantially 90°, thereby eliminating the error due parallax and prismatic effect of the glass and preventing eye-strain.

As shown in Figure 1, scales 20 are provided with scale marks 24 to designate the temperature sought to be maintained and the front of scale portion 3 is etched with marks 25 the middle of which corresponds to 97°, the lower 96° and the upper 98°. These scale marks and etched marks are preferably filled with black paint to increase their visibility.

I wish it to be understood that I intend to include within my invention such modifications and adaptations thereof as fall within the spirit thereof as defined in the appended claims.

Having thus fully described my invention, what I claim as new and desire to secure by Letters Patent is:

1. In a thermometer, a base having a substantially triangular cross-sectional contour from the front to the rear thereof, a longitudinally positioned recess in the face of said base solely for receiving the thermometer tube, an aperture in said base adjacent the end of said recess and in the thick portion of the triangular cross-section of said base, a thermometer tube mounted on said base within said recess and having a portion of the rigid tube stem extending rearwardly through said aperture, a protective sheath surrounding said rearwardly extending portion of said tube, said sheath having one end thereof extending into said aperture, and means on the rearward side of said base for engaging said sheath to lock the same in position within said aperture.

2. In a thermometer, a base having a substantially triangular cross-sectional contour from the front to the rear thereof, a longitudinally positioned recess in the face of said base, a second longitudinally positioned recess in the bottom surface of said first mentioned recess, a scale positioned within said first mentioned recess having an edge thereof adjacent the second mentioned recess, an aperture in said base adjacent the end of said recesses and in the thick portion of the triangular cross-section of said base, a thermometer tube mounted on said base within said second mentioned recess with the forward edge thereof in substantially the same plane as the faces of said scale, a portion of the rigid tube stem of said thermometer tube extending rearwardly through said aperture, a protective sheath surrounding said extending portion, said sheath having one end thereof extending into said aperture, and means on the rearward side of said base for engaging said sheath to secure the same in position in said aperture.

CHARLES F. GEDGE.